Dec. 25, 1951        F. L. MINNEAR        2,579,949
LAMINATED PRODUCT AND METHOD OF LAMINATING
Filed June 18, 1947
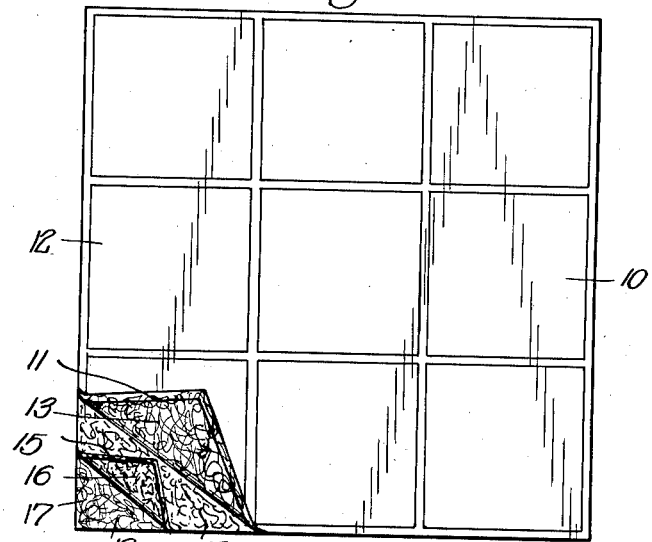
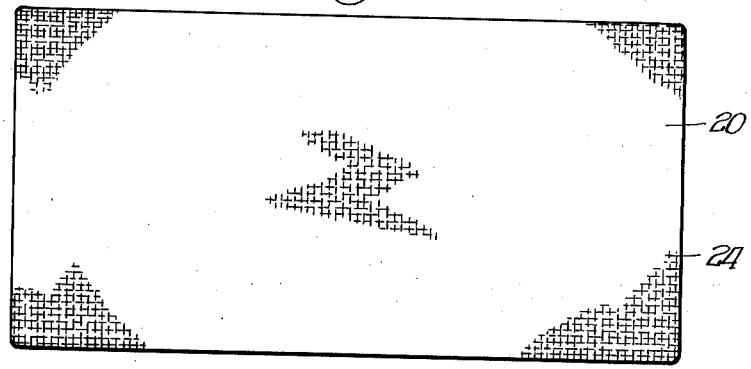
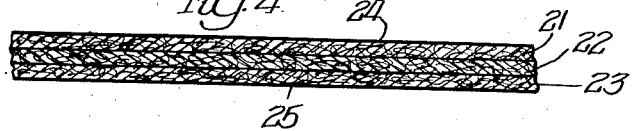
INVENTOR.
Festus L. Minnear,
BY
Cromwell, Greist & Worden
attys.

Patented Dec. 25, 1951

2,579,949

UNITED STATES PATENT OFFICE 2,579,949

LAMINATED PRODUCT AND METHOD OF LAMINATING

Festus L. Minnear, Mount Vernon, Ohio, assignor, by mesne assignments, to Continental Can Company, Inc., New York, N. Y., a corporation of New York Application June 18, 1947, Serial No. 755,302

3 Claims. (Cl. 154—128)

My invention is concerned with improvements in laminating and laminated products.

It is an object of my invention to provide an improved laminated product by impregnating paper, cellulose or similar materials with a flexible resin composition, forming a laminate of two or more sheets of the materials and subjecting the same to a polymerizing treatment to cure the resin composition.

It is a further object of my invention to provide areawise dimensional stability in a sheet of material, which is normally of such a nature that when subjected to humidity changes it will expand or contract to a degree that is objectionable for certain specific uses, by combining such material with a dimensionally stable sheet material.

It is a more specific object of my invention to provide a dimensionally stable laminated product, by impregnating with a flexible resin, webs of material which do not have dimensional stability, but which expand and contract substantially when subjected to humidity changes, such as paper or cellulosic materials, and combining the same with a web having dimensional stability, such as a web of woven glass fibers, which has also been impregnated with the flexible resin and subjecting the combined resin impregnated webs to a polymerizing treatment to form the laminated product.

These and other objects and advantages will be apparent from a description of the products, and the methods of making the same, which are illustrated by way of examples in the accompanying drawings, wherein:

Fig. 1 is a plan view showing a section of wall tile embodying the principles of my invention;

Fig. 2 is a cross section of the wall tile to a greatly enlarged scale;

Fig. 3 is a plan view of a table mat embodying the principles of my invention; and Fig. 4 is a cross section of the table mat to a greatly enlarged scale.

Paper and similar material such as cellulosic derivatives when subjected to humidity changes will expand or contract to a degree that is objectionable for certain specific uses. Such material is generally termed dimensionally unstable. When these materials are laminated with each other or with most other materials this characteristic remains and renders the laminate unfit for uses where dimensional stability is required such as in templates, wall tile or similar products where undue expansion and contraction resulting from exposure to moisture is objectionable.

Such non-dimensionally stable materials when combined with certain dimensionally stable materials, in accordance with the principles of my invention, will provide a laminated product which is dimensionally stable areawise.

In Fig. 2 of the drawings I have illustrated a laminated wall tile 10 which has been produced by the practice of my method. It consists of a top ply of sheet material 11 which is preferably a paper similar to blotting paper. Other fibrous material such as cellulose or cellulose derivatives may be used. The sheet 11 is provided with a printed design simulating wall tile on its top surface 12. The unprinted side 13 of the sheet 11 is laminated to the top surface 14 of a sheet of glass cloth 15. The sheet 15 is woven of glass fibers and possesses dimensional stability, that is, the material does not expand and contract to any substantial degree when subjected to moisture and temperature changes. Other dimensionally stable material, such as woven wire or "Saran" (vinylidine chloride) could be used. The bottom surface 16 of the dimensionally stable sheet 15 is laminated to the top surface 17 of a bottom sheet 18 which is similar to the top sheet 11. The bottom face 19 of the bottom sheet 18 is provided with a mat surface suitable for adhering the same to a wall or the like.

The tile 10 is produced by first impregnating the sheets of material 11, 15 and 18 with a relatively flexible thermosetting resin, then bringing the sheets into superimposed relation and finally polymerizing the resin to form a composite laminated product. The sheets 11, 15 and 18 are preferably in the form of webs of the material and the process is preferably carried out as a continuous operation by passing the webs of material through a resin bath, combining the webs, enclosing them between suitable covering webs and subjecting the composite web to a polymerizing treatment to cure the resin, after which the covering webs are removed. In this process the finish on the top and bottom surface of the laminate is varied by the use of different kinds of covering webs.

The type of resin composition which I prefer to use in my process is a polyester contact pressure resin composition which comprises primarily a polybasic acid, a polyalcohol and a vinyl compound such as styrene. The resin composition selected will be such as to produce a relatively flexible product when polymerized. A suitable resin composition, which is available commercially, is known as "Selectron 5203" and is manufactured by the Pittsburgh Plate Glass Company.

The covering materials which are used in the production of the laminate will determine the type of surface produced on the exterior surfaces. A mat finish is desired on the bottom or back surface of the tile for better adhesion to the wall surface. This may be obtained by using a paper coated with polyvinyl alcohol or melamine as a covering material. A parchment paper or glassine may also be used. To provide a gloss surface, such as desired on the top surface of the tile, a cellophane covering sheet may be used.

In Figs. 3 and 4 I have illustrated a laminated table mat 20 which has been produced in accordance with the principles of my invention. The mat 20 comprises three sheets or plies of sheet-like material which have been impregnated with the flexible resin composition and then cured in superimposed relation to form a laminated product.

The three plies of material 21, 22 and 23 are preferably paper material similar to blotting paper, such as the paper material used in the production of the wall tile (Fig. 1). The outer sheets 21 and 23 are preferably printed on their outer surfaces 24 and 25 with a suitable decorative design. The sheets 21, 22 and 23 are preferably provided in the form of continuous webs which are first passed through the resin bath, then brought together into superimposed relation and enclosed between outer covering sheets. Thereafter the superimposed impregnated sheets are subjected to a polymerizing treatment. This produces a relatively hard but flexible laminated product which is then cut into suitable size for the table mats. The resulting mat lies flat and does not turn up at the edges when subjected to moisture changes. The surface is relatively hard and will withstand considerable wear and abuse. The material is also moisture and heat resistant.

My invention is not limited to the production of wall tile or table mats but such products are referred to only by way of example. Designs such as simulated wood grain, cloth patterns or the like may be used to produce a laminated product having a variety of other uses.

I claim:
1. A method of forming a flexible dimensionally stable sheet-like product which comprises impregnating relatively thin woven glass fiber cloth with a relatively flexible thermosetting resin composition, impregnating paper sheets with the same resin composition, compounding the impregnated glass fiber cloth between the impregnated paper sheets, and polymerizing the resin composition.

2. A flexible laminated product comprising a dimensionally stable woven glass cloth sheet, a relatively soft paper sheet having a printed design on one side thereof bonded on its unprinted side to one side of said glass cloth sheet, and a relatively soft paper sheet bonded to the other side of said glass cloth sheet, said sheets being impregnated with and integrally joined to each other by a relatively flexible polymerized thermosetting resin.

3. A flexible plastic wall tile comprising an inner ply of woven glass cloth and two outer plies of relatively soft paper material bonded together by a polymerized relatively flexible thermosetting resin composition, one of said outer plies of material having a printed design simulating wall tile thereon and the other of said outer plies of material being provided with a mat surface.

FESTUS L. MINNEAR.

REFERENCES CITED

The following references are of record in the file of this patent:

UNITED STATES PATENTS

| Number | Name | Date |
|---|---|---|
| 1,454,845 | Clay | May 15, 1923 |
| 1,825,877 | Loetscher | Oct. 6, 1931 |
| 2,388,184 | Ripper | Oct. 20, 1945 |
| 2,414,125 | Rheinfrank | Jan. 14, 1947 |
| 2,417,586 | Crosley | Mar. 18, 1947 |
| 2,429,688 | Hoover | Oct. 28, 1947 |
| 2,432,752 | Gray | Dec. 16, 1947 |
| 2,443,740 | Kropa | June 22, 1948 |
| 2,496,911 | Green | Feb. 7, 1950 |
| 2,496,665 | Hermanson | Feb. 7, 1950 |